United States Patent [19]
Baird et al.

[11] Patent Number: 5,157,486
[45] Date of Patent: Oct. 20, 1992

[54] HIGH RESOLUTION CAMERA SENSOR HAVING A LINEAR PIXEL ARRAY

[75] Inventors: Randy K. Baird, Bolivar; Stanley P. Turcheck, Jr., Homer City; James P. Martin, Blairsville, all of Pa.

[73] Assignee: FMC Corporation, Chicago, Ill.

[21] Appl. No.: 586,167

[22] Filed: Sep. 21, 1990

[51] Int. Cl.⁵ .............................................. H04N 7/18
[52] U.S. Cl. ...................................... 358/101; 358/107
[58] Field of Search ..................... 358/101, 106, 107; 382/8

[56] References Cited

U.S. PATENT DOCUMENTS

| | | | |
|---|---|---|---|
| 4,254,433 | 3/1981 | Dewar, Jr. et al. | 358/101 X |
| 4,642,813 | 2/1987 | Wilder | 358/101 X |
| 4,707,734 | 11/1987 | Labinger et al. | 358/106 |
| 4,794,453 | 12/1988 | Gnuechtel et al. | 358/101 |
| 4,799,175 | 1/1989 | Sano et al. | 358/106 X |
| 4,811,409 | 3/1989 | Cavan | 358/101 X |

Primary Examiner—Victor R. Kostak
Attorney, Agent, or Firm—Douglas W. Rudy; Richard B. Megley

[57] ABSTRACT

A high resolution object handling system serves as an object discrimination—identification by creating an object silhouette. The objects are singulated on a conveyor and scanned by a linear array of CCD units (2048 pixels per inch) at a scan rate of 10 MHz. Pixel transitions corresponding to object edge points are converted to a single count value from a counter which is synchronized with the scanner. A microprocessor with a first in, first out buffer memory needs only a capacity to handle the count value rather than all data from the pixels.

4 Claims, 5 Drawing Sheets

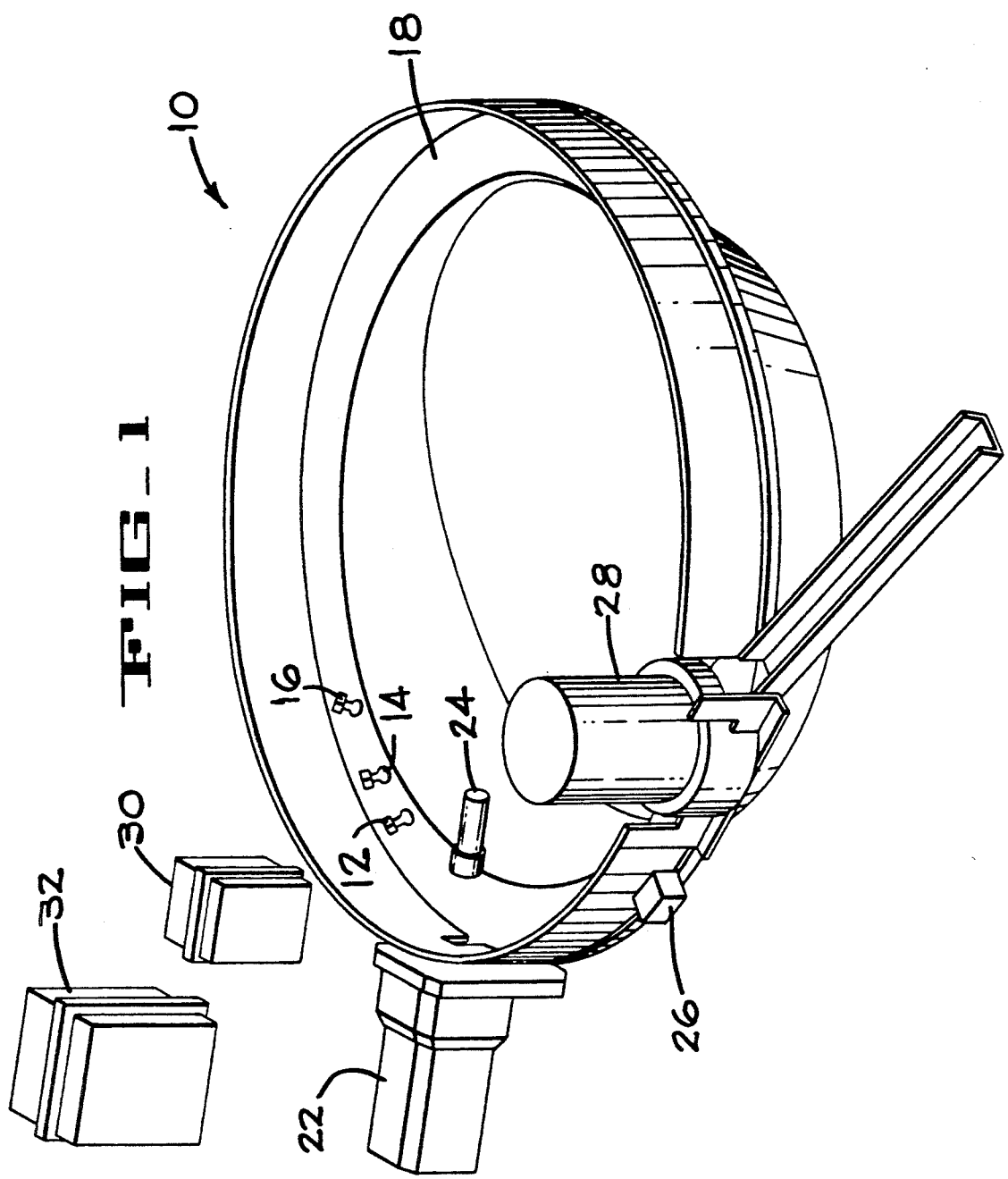

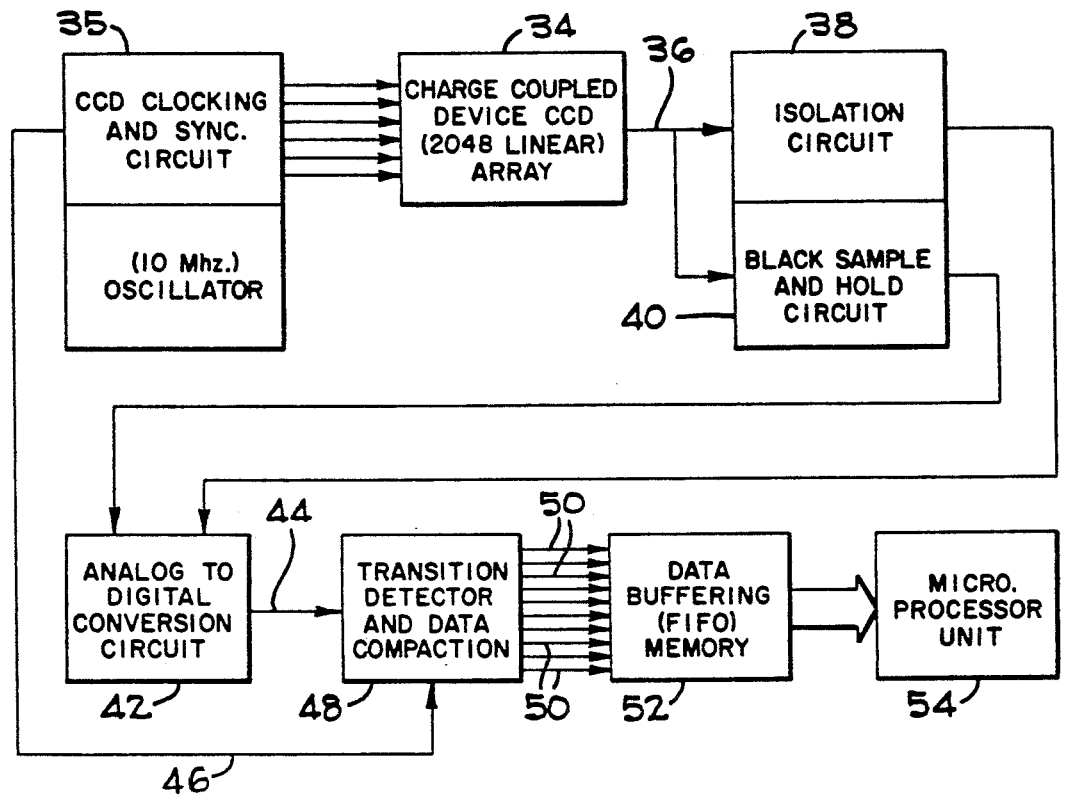
FIG_2
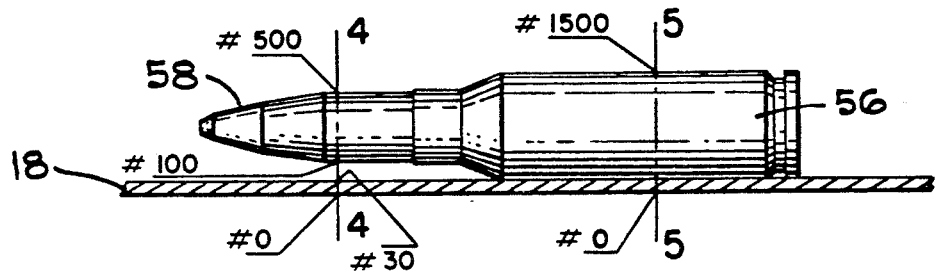
FIG_3

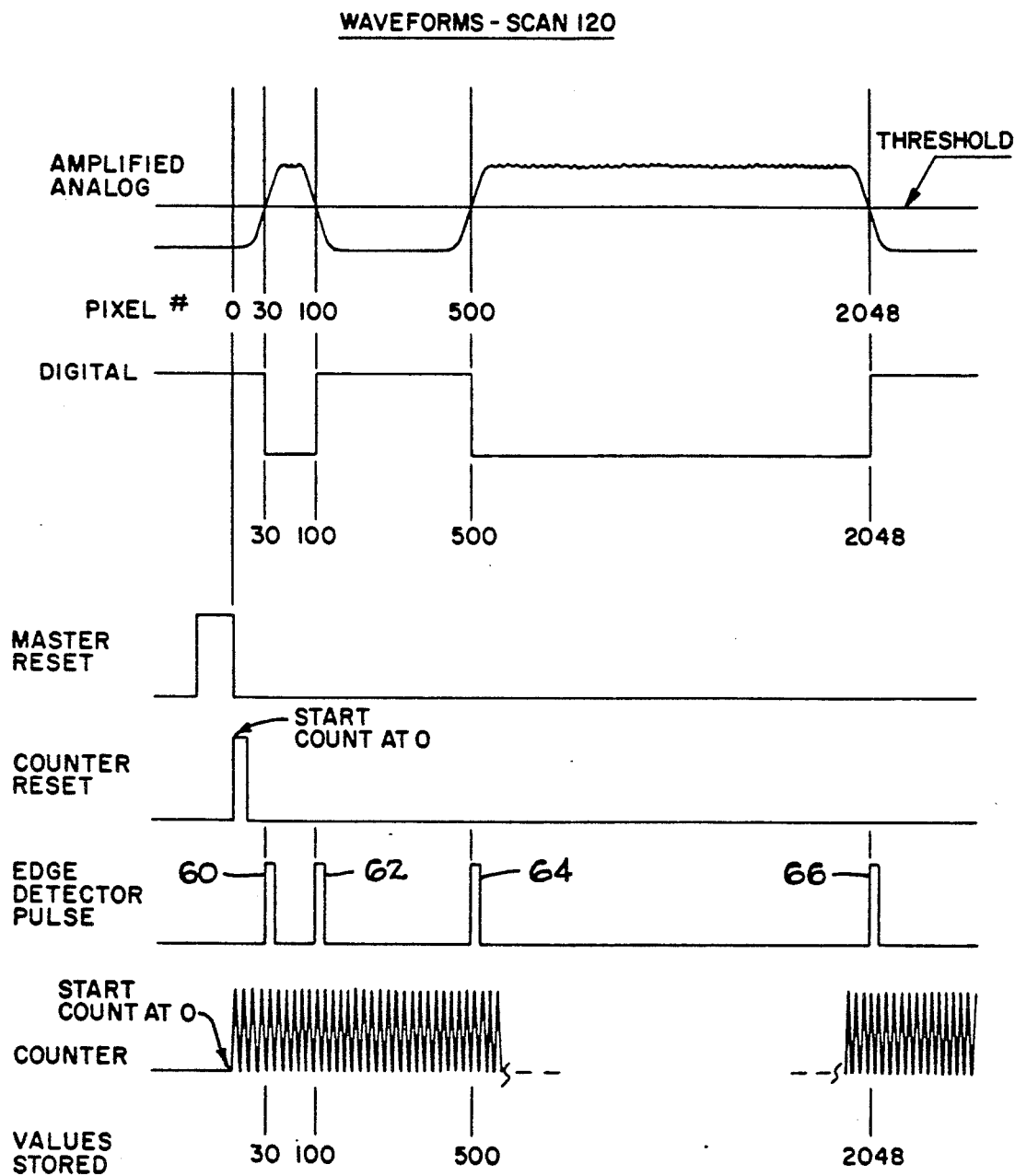

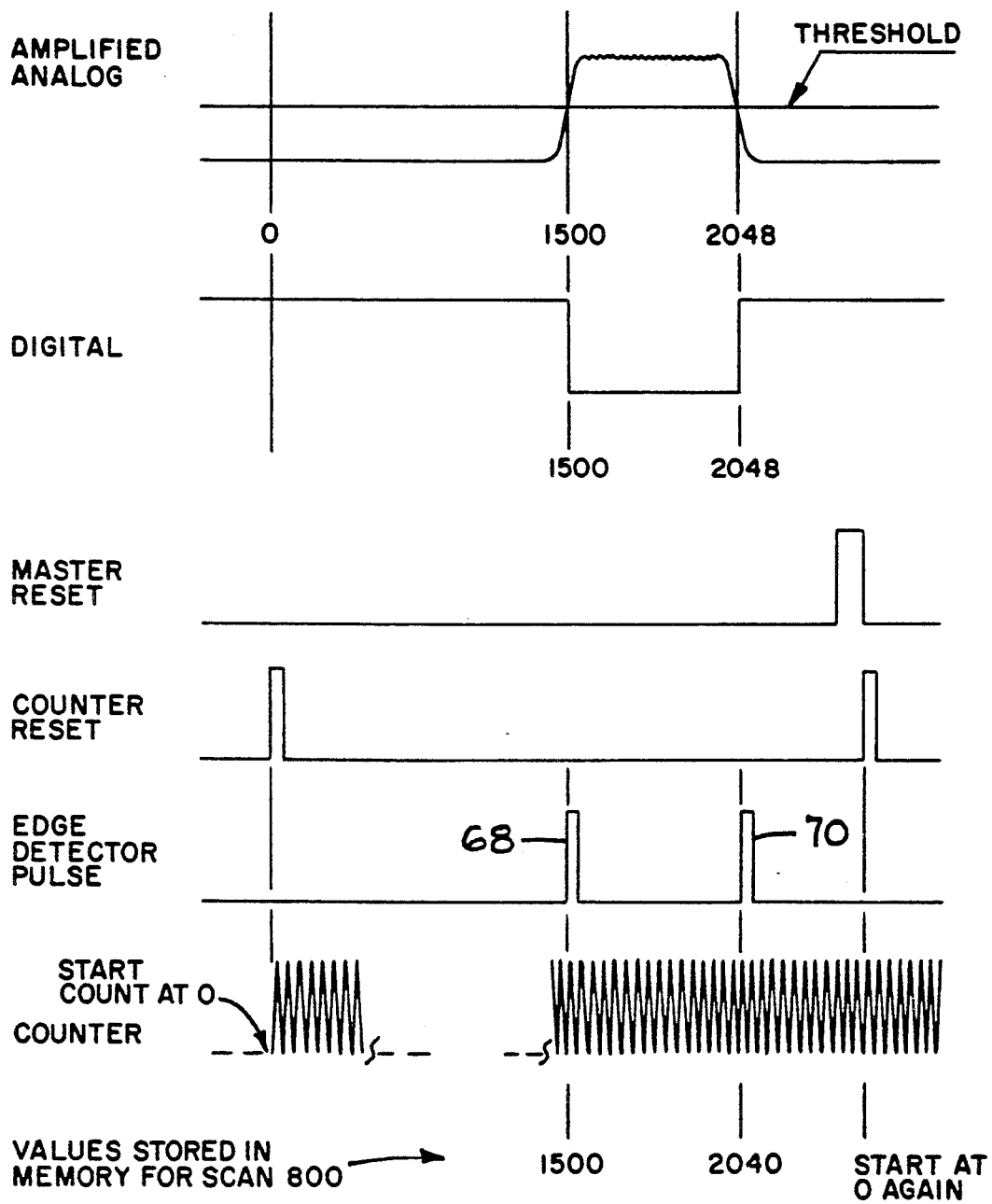

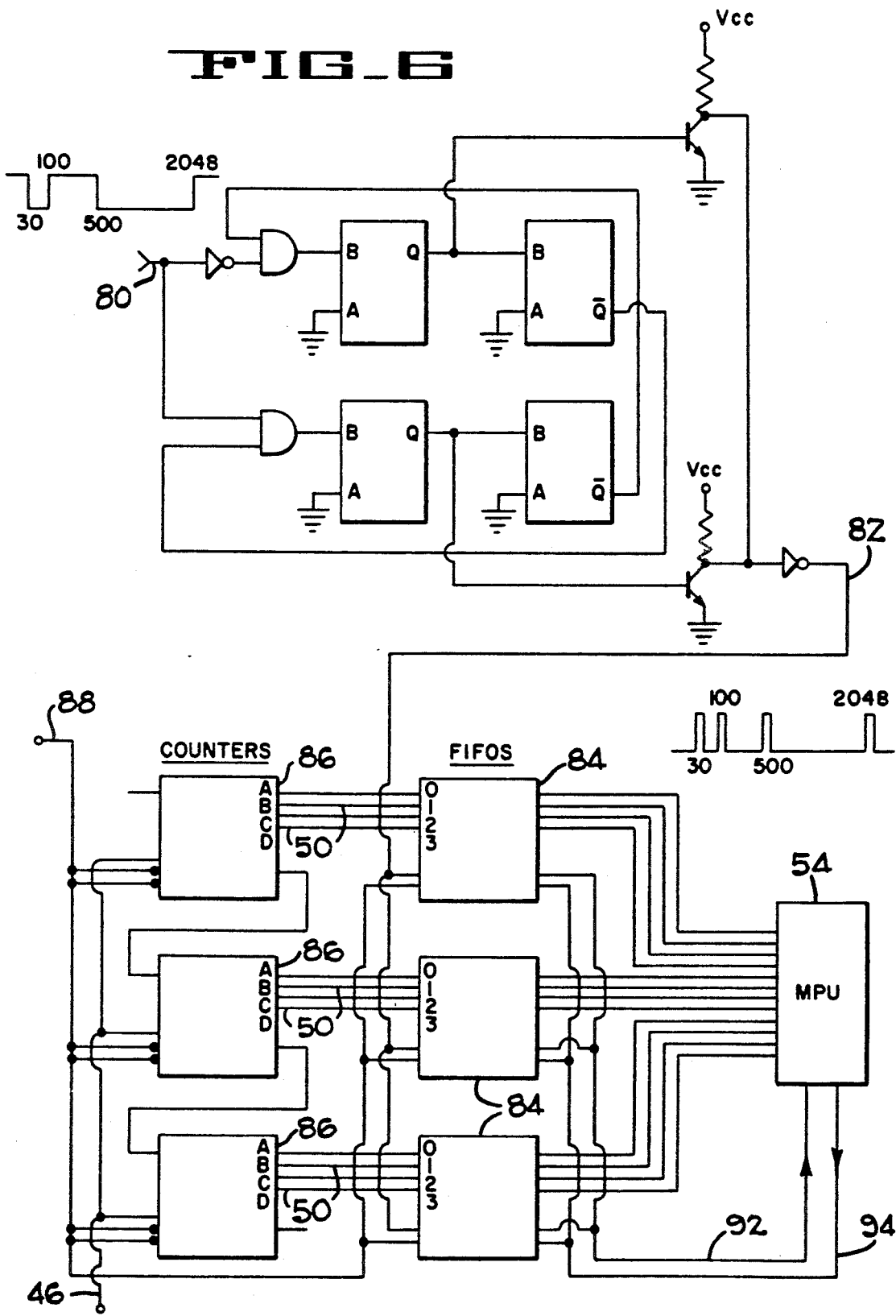
FIG_6

HIGH RESOLUTION CAMERA SENSOR HAVING A LINEAR PIXEL ARRAY

This invention relates to a camera sensor having a linear array of CCD units that are used in connection with the real-time creation of a high resolution silhouette image or an object on a moving conveyor.

BACKGROUND INFORMATION

In the inspection by video equipment of a stream of like objects being sequentially transported on a conveyor, it is required that the image processing be done on a real time basis to produce the necessary secondary control signals. Various prior art techniques are disclosed in Ohyama U.S. Pat. No. 4,866,783 and Turcheck et al U.S. Pat. No. 4,784,493.

Composite video signals are not required for some applications. Therefore a raster scan is not essential. It may be sufficient to have a high resolution silhouette of an object elevation to determine the object orientation or size. Real time processing of large amounts of data is prohibitive for a feasible low-cost system due to the processing time involved and huge memory requirements to store all the information customarily used. Usual solutions would be to invest in an expensive, faster computer and to add on the required memory.

SUMMARY OF INVENTION

It is an object of the invention to provide a novel method and system for the scanning of a object with a linear array of pixels for sensing the position of an objects marginal edge. Where the object is on a horizontal conveyor, the linear array of pixels may be disposed vertically to provide information conforming to a trace of the upper marginal edge and other surface features that appear as a part of a silhouette of the object.

The method includes scanning a linear array of CCD units that are shadowed by the profile of objects on a moving conveyor producing a unique signal related to the position of at least one object marginal edge. The analog voltage produced by a sequential scan of the pixels results in a transfer of each pixel charge fully and does not allow any charge to accumulate between resets and next scan. Each reset involves the application of a momentary voltage to all the pixels and the amount of charge varies depending in whether the pixel is illuminated or shadowed by the object.

An analog signal is produced during each scan and is made up of a voltage related to pixel charges which appear sequentially in a serial bit stream of uniform length. The shadowed pixels have a lower charge then the illuminated pixels. The exact location of a transition between shadow and illumination is precisely determined where 1000 to 4000 pixels per inch of linear array are provided. Each transition is converted to a digital pulse edge which occurs in timed relation to the transition.

These and other objects of the invention will become more fully apparent from the claims and from the description as it proceeds in conjunction with the accompanying drawings.

BRIEF DESCRIPTION OF DRAWINGS

FIG. 1 is a diagrammatic view of a conveyor system for separating and orienting parts, together with a novel inspection camera and information processor;

FIG. 2 is a block diagram of a camera sensor and related functional circuitry for acquiring and storing object silhouette information;

FIG. 3 is an elevation of a conveyor moving surface that is supporting a round of ammunition;

FIG. 4 is a group of waveforms taken at scan position 120 as depicted by line 4—4 of FIG. 3;

FIG. 5 is a group of waveforms taken at scan position 800 as depicted by line 5—5 of FIG. 3; and FIG. 6 is a diagram of a suitable circuit arrangement for hardware that can compact the object image intelligence data.

DETAILED DESCRIPTION OF PREFERRED EMBODIMENT

The present invention is adapted for use with conveyors that move a series of like objects on a repetitive basis for automated inspection or assembly. The invention serves as a substitute for human inspection of the object orientation on the conveyor surface and is adapted to provide data representation concerning a part size that may have a resolution as little as 0.0005 inches.

In the illustrated conveyor 10 of FIG. 1, objects 12, 14, 16 rest on a surface 18 that moves in a counter-clockwise direction while a tilted central disk rotates at a slower speed to load objects in spaced positions along conveyor surface 18 in a known manner. The objects 12, 14, 16 pass between a camera sensor 22 and a light source 24 after which they move downstream to a conventional detector (26 and diverter 28 which enables reorientation and/or rejection of improperly oriented or sized articles. The diverter may of the general type as show in Dean et al U.S. Pat. No. 4,619,356.

In accord with one feature of the present invention, a camera sensor 22 is not a raster scan type, but instead consists of a linear array of charge coupled device (CCD) units. The CCD units are aligned to be transverse to the direction of object movement. The linear array of CCD units thus may be essentially vertical in the case of a horizontal conveyor. The CCD units are aligned in a single column that is one pixel wide and at least about 1000 pixels high. The height of the CCD unit column must be sufficient to span the feature of interest of the object 12, 14, 16 on the conveyor 18. For many small objects such as bolts, screwdriver handles, small caliber ammunition and the like, a maximum variation of the feature of interest may be within a one inch span.

A silhouette image data obtained for certain applications must have a 0.0025 inch resolution. The number of CCD units in the one inch column may conveniently be about 2000 and advantageously may be 2048. An even smaller resolution below 0.0005 inches may be obtained with the use of about 3000 or 4000 pixels in a one inch column. The linear array of CCD units may be obtained commercially from Texas Instruments as TC-103-1. The drive circuitry necessary for proper CCD operation and timing diagrams to provide a sequential scan of the analog voltage signal are commercially available. The scan rate must provide sufficient time to transfer each pixel charge fully and not allow any charge to accumulate in a pixel between reset and the next scan at which time a momentary voltage is applied to each of the CCD sensing units.

In the system of the present invention, the light source 24 is located across the conveyor surface 18 to face the CCD units. As an object 12, 14, 16 passes between the light source 24 and the camera sensor 22, a shadow is formed on certain of the pixel areas whereas unblocked pixels are fully illuminated by the light. By use of a collimated light source which operates through a lens having a shape and size corresponding to that of the linear array of CCD units forming a camera sensor, a precise point on the upper edge surface of the object can be optically determined with great accuracy. Variations in ambient light conditions are less likely to interfere with operation of the camera sensor when a collimated light source is used.

If the object has a point on the lower edge surface that is positioned above the conveyor surface, a light beam will be detected at appropriately positioned pixels in the same linear array at a point on the lower surface which is opposite the detected point on the upper object surface. Similarly, an aperture in the object which is aligned between the collimated light source and the camera sensor will produce transitions in the adjacent pixels to provide a manifestation of the marginal edge points of the aperture at successive positions as the object advances past the camera sensor.

Successive exposures of the camera sensor 22 to each object 12, 14 or 16 as it moves along the conveyor path 18 gives successive data inputs which may be sequentially processed and collectively used to provide as a display, a silhouette of the object before the object reaches the diverter station 28. Object speed on the conveyor may be several inches per second depending upon the desired resolution. Successive scans may be provided at 300 microsecond intervals with a 2048 pixel linear array driven by a 10 MHz clock. Conveyor speeds up to seven inches per second may be acceptable without exceeding the resolution accuracy specified.

The installation as illustrated in FIG. 1 may include also a system control 30 and control box 32 which are usually physically located near the conveyor.

With reference to FIG. 2, a functional block diagram of the camera sensor 22 is illustrated. The vertical column of CCD units 34, consisting of a 2048 pixel linear array in the illustrated embodiment, is connected to receive clocking or timing signals from the clock and sync circuit 35. Clock circuit 35 includes an oscillator running at a frequency of at least about one MHz, and 10 MHz in the illustrated example, in order to provide pixel scanning in about 200 microseconds and 100 microseconds for reset operation. The CCD units that are commercially available are capable of running at clock frequencies as high as 40 MHz. Thus, pixel scan during a 300 microsecond sampling scan after conditioning, is used to produce an analog information signal which contains a transition relating to the precise position of an edge point on an object or part which is being conveyed.

From the column of CCD units 34, which each functions as a pixel, an output signal on lead 36 in the form of an analog signal voltage (see FIGS. 4 and 5) containing sequentially obtained voltages of a first amplitude for shadowed pixels and a second low amplitude for those pixels receiving light from light source 24. The analog information is a serial bit stream of uniform length and is transferred serially at the clock rate to a voltage follower that serves as an isolation circuit 38 and to a black sample and hold circuit 40 which produces a voltage level reference signal from pixels that are blocked from receiving light. This provides a reference signal which holds the analog signal at a controlled DC level and may be used as one input to circuitry associated with an analog to digital conversion circuit 42.

The output signal on lead 44 is applied to the transition detector and data compaction circuitry 48 which will be described in connection with FIG. 6. On lead 46, a clock signal from the clocking and sync circuit 35 is applied to maintain synchronization between the data compaction unit 48 and the scanning means that is part of the charge coupled device array 34.

The output signals from the data compaction device 48 on leads 50 is in the form of a single binary number for each transition from the analog to digital conversion circuit and is applied to the memory 52 which serves as a buffer to collect all of the data for a particular object 12, 14 or 16 on the conveyor surface on a first in, first out basis. The microprocessor unit 54, which may be any suitable type that is commercially available, may start to process the output signals as soon as the memory 52 begins to receive valid object data.

The camera sensor 22 is thus synchronized with a counter in the data compactor 48 by means of the clocking and sync circuit 35. The memory 52 for data buffering may have a 64K or even smaller capacity for objects of the type mentioned above. As pointed out above, low cost commercially available components have a capability to operate up to a 10 MHz data rate in a reliable fashion thereby providing a low cost hardware product.

With reference to FIG. 3, there is illustrated a round of ammunition which has a cylindrical cartridge or casing 56 that is supported on a conveyor surface 18 and a projectile 58. FIG. 4 contains a group of waveforms taken along line 4—4 of FIG. 3 and FIG. 5 contains a group of similar waveforms taken along line 5—5 of FIG. 3. FIG. 4 waveforms are taken at a position corresponding to scan 120 whereas, the FIG. 5 waveforms are taken at scan 800.

In FIG. 4, the waveform of the amplified analog signal starts at time 0 in a black condition because of the conveyor 18. At pixel 30, which corresponds to count 30 in a counter, light is detected thereby starting a negative going digital pulse and a positive going edge detector pulse 60. At pixel 100, the lower edge point on the silhouette of the projectile 58 is effective to block light and create a further edge detector pulse 62. At pixel 500, the light is again detected, thereby causing a third edge detector signal 64 to be generated. Finally, at the top of pixel linear array and pixel 2048, the scanner no longer produces a signal and an end of scan transition detector pulse 66 is generated.

A conventional binary counter capable of counting up to at least 2048 at the clock frequency is synchronized with the scan of the 2048 pixels in the camera sensor as indicated at the bottom waveform of FIG. 4. The clock is reset to start at zero as the scan starts so that count values of 30, 100, 500 and 2048 are stored in the memory 52 of FIG. 2 as determined by the time of occurrence of edge detector pulses 60, 62, 64 and 66.

FIG. 5 shows the corresponding waveforms that occur at scan 800. Since the lowest point on the cylindrical casing 56 rests on the conveyor surface 18, the lowest 1499 pixels in the linear array are dark and the first transition occurs with pixel 1500, which is aligned with the upper edge point of the cartridge casing 56 at scan position 800.

The edge detector pulse 68 is generated in response to the transition at pixel 1500 and causes the count value of 1500 to fall through the memory 52 to its output terminals. A similar edge detector pulse 70 occurs at count 2048. Thereafter, a master reset pulse is generated. The counters are reset to a zero count by a counter reset signal which is synchronized with the beginning of the next scan of the pixels.

FIG. 6 shows one preferred embodiment for converting the digital signals of FIGS. 4 and 5 into count values that are supplied to the microprocessor unit (MPU) 56. The digital signal from FIG. 4, in the form of incoming serial binary bit, is applied to terminal 80 of a negative and positive edge detecting network that detects changes in the binary state and issues for each positive or negative edge a 50n sec. pulse on lead 82. At a 10 MHz clock frequency, the scanned information data and clock counts are separated by 100n sec. The 50n sec. pulse is used to gate on the memory unit 52 (FIG. 2) which includes FIFO registers 84 as illustrated in FIG. 6. The three binary counter registers 86 that operate with clock signals on lead 46 are reset by a counter reset signal on lead 88. The count value on leads 50 is constantly presented to the FIFO registers 84. However, the count values are allowed to drop through the FIFO registers 84 only when an edge detector pulse on lead 82 is present. In this example, the count values of 30, 100, 150 and 2048 are stored.

When a count value falls through the FIFO registers 84, the FIFO issues an output ready signal to MPU 54 on lead 92. When the MPU sees an output ready signal, it issues a shift out signal on lead 94 to FIFO registers 84 which releases the count value immediately to the MPU 90. The data at this point is then coded object image intelligence. This handshaking continues throughout the entire scan cycle and sequentially throughout all scans of a object.

As is evident from the foregoing, for the scan 120, only four count values are processed and stored rather than 2048 bits of scan information. Other scans such as scan 800 may have only two count values that are processed. The number of scans may be decreased where less resolution in the horizontal direction is acceptable thereby further reducing the processing time. This compaction of data increases processing speed and reduces memory size requirements without sacrificing resolution of the silhouette image.

While only a single embodiment has been illustrated, other modifications and variations will become apparent to those skilled in this art. The illustrated embodiment has a degree of sophistication which can be simplified for less demanding applications. It is therefore intended that the variations and modifications which fall within the scope of the appended claims and equivalents thereof be covered thereby.

We claim:

1. A method for scanning a position of a marginal edge of an object comprising:
    moving the object relative to a camera sensor along a general direction of said marginal edge;
    providing a linear array of CCD units which serve as pixels in said camera sensor, said linear array extending transverse to the direction of relative movement and spanning the object marginal edge wherein the number of CCD units in the linear array is greater than 1000, the units all face a light source and the object is moved along a path between the light source and the CCD units to thereby cast a shadow on a first portion of the pixels in said linear array while a second portion of said pixels remain fully illuminated
    repeatedly applying a momentary voltage to said CCD unit linear array;
    scanning said pixels between successive voltage application to transfer each pixel charge fully and not allow any charge to accumulate between resets and next scan;
    detecting the position of adjacent pixels where a transition between a shadowed and illuminated pixel occurs.

2. A camera sensor for sensing and storing a position of a marginal edge of an object in a first direction as the object moves relative to the camera sensor in a second direction that is transverse to the first direction comprising:
    the camera sensor having only a single vertical row of CCD type sensing elements forming pixels disposed along one side of a horizontal conveyor and a source of collimated light disposed on an opposite side of said conveyor and directed toward said pixels;
    means periodically applying a momentary voltage to said sensing elements as one of said object and camera sensor move along said second direction to relatively different positions;
    means to transfer from said linear column of sensing elements an analog information signal serially to an analog to digital conversion circuit during each period between voltage applications; and
    means providing an encoded electrical signal output based on spaced points defining said object marginal edge.

3. The camera sensor of claim 2 wherein the object on said horizontal conveyor has a body portion having upper and lower marginal edges, the sensor is effective during each scan to detect upper and lower marginal edge points of said body portion and the analog information signal is effective to produce two output signals from the analog to digital conversion circuit thereby to give a manifestation of the distance in the first direction that is related to the distance between said upper and lower edge points.

4. The camera sensor of claim 3 wherein the sensing elements are comprised of at least 2000 charge coupled devices per inch and aligned in a vertical column thereby to give a resolution for said distance that is no greater than about 0.0025 inches.

* * * * *